(12) United States Patent
Soto et al.

(10) Patent No.: US 8,907,795 B2
(45) Date of Patent: Dec. 9, 2014

(54) SYSTEM AND METHOD FOR DETECTING MOVEMENT OF A TAGGED ARTICLE INCLUDING TRAFFIC PATTERN DETERMINATION

(75) Inventors: Manuel A. Soto, Lake Worth, FL (US); Adam S. Bergman, Boca Raton, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 187 days.

(21) Appl. No.: 13/604,788

(22) Filed: Sep. 6, 2012

(65) Prior Publication Data
US 2014/0062728 A1    Mar. 6, 2014

(51) Int. Cl.
*G08B 21/00*    (2006.01)
(52) U.S. Cl.
USPC ...................................... 340/572.1; 340/10.1
(58) Field of Classification Search
CPC .............................. G06K 7/00; G06Q 10/0833

USPC .......... 340/540, 568.1, 572.1, 10.1; 235/375, 235/383, 385
See application file for complete search history.

(56) References Cited

U.S. PATENT DOCUMENTS 8,487,747 B2 *   7/2013   Morin ......................... 340/10.2

* cited by examiner

*Primary Examiner* — Jeffery Hofsass (57) ABSTRACT

A system for determining motion of a tagged article may include a tag detection sub-system, a traffic pattern determination sub-system, and a monitoring sub-system. The tag detection sub-system is configured to output tag data regarding movement of the tagged article with respect to a tag detector proximate an exit portal of a location. The traffic pattern determination sub-system is configured to output traffic data regarding movement of an individual with respect to the exit portal of the location. The monitoring sub-system may include a correlation module configured to compare the tag data with the traffic data to accurately determine one or both of motion or path of the tagged article.

24 Claims, 4 Drawing Sheets

SYSTEM AND METHOD FOR DETECTING MOVEMENT OF A TAGGED ARTICLE INCLUDING TRAFFIC PATTERN DETERMINATION

BACKGROUND OF THE DISCLOSURE

Embodiments generally relate to a system and method of detecting the presence of an object, such as merchandise within a retail establishment. More specifically, embodiments relate to a system and method of accurately determining movement of an object within a location.

Various businesses track products through the use of radio-frequency identification (RFID) systems. For example, RFID systems may be used to track products for purposes of inventory, logistics, and the like.

An RFID system is typically a wireless, non-contact system that uses radio-frequency (RF) electromagnetic fields to transfer data from a tag or label attached to an object in order to identify and track the object. In the retail clothing industry, for example, RFID tags may be secured to articles of clothing, for example.

Typically, an RFID system includes tags or labels attached to the objects that are to be tracked and identified. Two-way radio transmitter-receivers, such as interrogators or readers, send signals to the tag and read encoded responses from the tag. The readers transmit observations regarding the tag or label to a computer system running RFID software, for example.

Information may be stored electronically in a non-volatile memory of the tag. The RFID tag includes a small RF transmitter and receiver. An RFID reader transmits an encoded radio signal to interrogate the tag. The tag receives the message and responds with identification information. The identification information may be a unique tag serial number, or product-related information such as a stock number, lot or batch number, production date, or other specific information.

Because RFID tags have individual serial numbers, the RFID system, by way of an RFID reader, for example, is able to discriminate among several tags that are within the range of the RFID reader. In general, RFID tags may include an integrated circuit for storing and processing information, modulating and demodulating a radio-frequency (RF) signal, collecting direct current power from the incident reader signal, and other specialized functions, and an antenna for receiving and transmitting the signal.

An RFID system may be configured to detect a moving RFID tag within a particular location. Detection of a moving RFID tag is typically used to determine whether or not a product having an RFID tag is moving toward an exit of a location. Such information may be used to determine if the product is being unlawfully removed from the location. For example, if an RFID system detects that a product having an RFID tag is moving toward an exit of a store, the RFID system may generate an alert that the product is in jeopardy of being stolen. In general, detection of moving RFID tags affixed or secured to items is useful for security, as well as accurate inventory determination.

While businesses often track products for purposes of inventory, logistics, and the like through the use of RFID systems, many businesses also utilize separate and distinct theft-detection systems. For example, many retail stores include theft-detection systems proximate the entrance/exit of the particular stores.

As an example, various locations utilize electronic article surveillance (EAS) systems, which are often used to prevent theft and similar unauthorized removal of articles from a controlled area. Typically, a system transmitter and a system receiver are used to establish a surveillance zone, which must be traversed by any article being removed from the controlled area.

An EAS tag, which may be or include an RFID tag, may be affixed to each article and includes a marker or sensor adapted to interact with a signal that is transmitted by the system transmitter into the surveillance zone. The interaction causes a further signal to be established in the surveillance zone, which is received by the system receiver. Accordingly, upon movement of a tagged article through the surveillance zone, a signal is received by the system receiver, identifying the unauthorized presence of the tagged article in the zone.

Typically, however, a surveillance zone of an EAS system includes areas that are outside of a desired monitored area. For example, an EAS system may include backfield and/or over-range areas that are outside of a passage through which individuals pass into and out of a location. If an individual is within a backfield or over-range area, an alarm may be generated, despite the individual not being within the passage. In an attempt to minimize such false alarms, some systems utilize directional counting devices. For example, infrared transmitters and receivers may be secured to or proximate the EAS system at or proximate the portal. When the aligned beams are broken in a particular sequence, the system may determine that an individual is exiting a location. When used in conjunction with the EAS system, the directional counting devices may more accurately determine alarm events. However, if multiple individuals are present, the system may still yield false alarms. For example, if an individual with a tagged article is in a backfield or over-range area, and another individual without a tagged article passes through the exit portal, an alarm may erroneously be generated due to the system detecting the tag in the backfield or over-range area, and movement of the individual without the tagged article.

BRIEF DESCRIPTION OF THE DISCLOSURE

Certain embodiments of the present disclosure provide a system for determining motion of a tagged article. The system may include a tag detection sub-system, a traffic pattern determination sub-system, and a monitoring sub-system. The tag detection sub-system may be configured to output tag data regarding movement of the tagged article with respect to a tag detector proximate an exit portal of a location. The traffic pattern determination sub-system may be configured to output traffic data regarding movement of an individual with respect to the exit portal of the location. The monitoring sub-system may include a correlation module configured to compare the tag data with the traffic data to accurately determine motion and/or path of the tagged article.

The tag detection sub-system may include one or more tag detectors in communication with a tag analysis module. The tag analysis module may be configured to generate the tag data based on signals received from the tag detector(s). The tag detector(s) may be configured to detect the tagged article within one or more surveillance zones. The tag data may vary throughout the surveillance zone(s). For example, the tag data may be different when the tagged article is between opposing tag detectors within an envelope of the exit portal, as compared to when the tagged article is outside of the envelope of the exit portal. The tag detector(s) may include one or more pedestals. Each pedestal may include a transceiver configured to communicate with the tagged article. The tag detection sub-system may include a radio frequency identification (RFID) reader, and the tagged article may include an RFID tag.

The traffic pattern determination sub-system may include a traffic monitor in communication with a pattern recognition module. The pattern recognition module may be configured to generate the traffic data based on signals received from the traffic monitor. The traffic monitor may be configured to monitor movement within a traffic surveillance area proximate the exit portal. The traffic surveillance area may be divided into a plurality of grid elements. The traffic monitor may include one or more of a video camera, an infrared camera, or a thermal imaging device.

The correlation module may determine that the tagged article is moving toward the exit portal when the tag data correlates with the traffic data. The correlation module may determine a degree of correlation based on a comparison of a correlation between the tag data and the traffic data with a threshold value.

Certain embodiments of the present disclosure provide a method of determining motion of a tagged article. The method may include generating tag data regarding movement of the tagged article with respect to a tag detector proximate an exit portal of a location, generating traffic data regarding movement of an individual with respect to the exit portal of the location, and comparing the tag data with the traffic data with a correlation module of a monitoring sub-system. The comparing operation accurately determines motion and/or path of the tagged article.

The generating tag data operation may include generating the tag data based on signals received from one or more tag detectors. The generating tag data operation may include detecting the tagged article within one or more surveillance zones. The tag data may vary throughout the one or more surveillance zones. The method may also include configuring the tag detectors as one or more pedestals proximate the exit portal. The generating tag data operation may include generating radio frequency identification (RFID) tag data.

The generating traffic data operation may include generating the traffic data based on signals received from a traffic monitor. The generating traffic data operation may include monitoring movement within a traffic surveillance area proximate the exit portal. The traffic surveillance area may be divided into a plurality of grid elements. The traffic monitor may include one or more of a video camera, an infrared camera, or a thermal imaging device.

The method may also include determining, with the correlation module, that the tagged article is moving toward the exit portal when the tag data correlates with the traffic data. The determining operation may include determining a degree of correlation based on a comparison of a correlation between the tag data and the traffic data with a threshold value.

DETAILED DESCRIPTION OF THE DISCLOSURE

Figure 1:
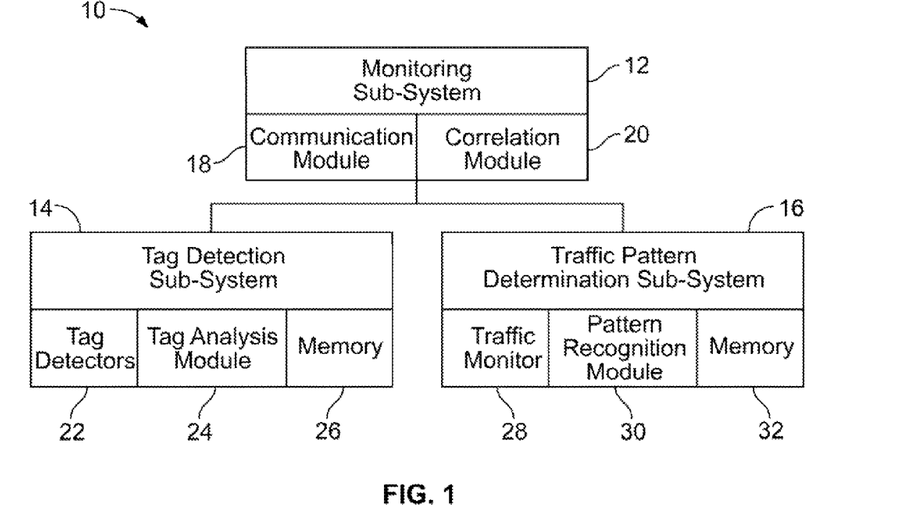
FIG. 1 illustrates a simplified block diagram of a tag detection system, according to an embodiment of the present disclosure.

FIG. 1 illustrates a simplified block diagram of a tag detection system 10, according to an embodiment of the present disclosure. The system 10 may include a monitoring sub-system 12 in communication with a tag detection sub-system 14 and a traffic pattern determination sub-system 16.

The monitoring sub-system 12 may be a computing system, having one or more processors, microcontrollers, integrated circuits, memory, and the like. For example, the monitoring sub-system 12 may include a central computer workstation within a location. The monitoring sub-system 12 may include a communication module 18 operatively connected to the tag detection sub-system 14 and the traffic determination sub-system 16. For example, the communication module 18 may connect to the sub-systems 14 and 16 through wired or wireless connections. The monitoring sub-system 12 may also include a correlation module 20 configured to receive and analyze data from the tag detection sub-system 14 and the traffic pattern determination sub-system 16. The correlation module 20 is configured to correlate data received from the tag detection sub-system 14 and the traffic pattern determination sub-system 16 to determine if a tagged article is being removed from a location, as explained below.

The tag detection sub-system 14 may be an electronic article surveillance (EAS) system, an RFID system, an RF system, a microwave detection system, and/or the like, for example. In short, the tag detection sub-system 14 is configured to detect the presence of a tagged article within a surveillance zone. The tag detection sub-system 14 may include one or more tag detectors 22 in communication with a tag analysis module 24 and a memory 26, such as random access memory (RAM), read only memory (ROM), one or more data buffers, flash memory, and/or the like. The tag detectors 22 may include transmitters, receivers, transceivers, and/or the like configured to detect the presence of a tagged article. For example, the tag detectors 22 may be configured to detect the presence of an RFID tag, EAS tag, or the like, within a surveillance zone. The tag analysis module 24, which may include one or more processors, microcontrollers, integrated circuits, and/or the like, is configured to receive signals from the tag detectors 22 and generate tag data to determine if a tagged article is within the surveillance zone. The signals and/or tag data may be stored in the memory 26. The tag data may then be transmitted to the communication module 18 of the monitoring sub-system 12.

If the tag detectors 22 detect a tag in the surveillance zone, a tag signal parameter, such as tag amplitude, may be stored in the memory 26, such as an amplitude buffer. Next, the tag analysis module 24 may track an amplitude pattern of the tag.

For example, the tag analysis module 24 may determine whether the tag amplitude that is tracked is greater or less than the stored tag amplitude. If greater, then the tag analysis module 24 may determine that the tagged article is moving closer to a tag detector pedestal proximate an exit portal. If less than the stored tag amplitude, the tag analysis module 24 may determine that the tagged article is moving away from the tag detector pedestal proximate the exit portal. Alternatively, the tag analysis module 24 may store and track a rate of change of amplitude of the tag signal.

The traffic pattern determination sub-system 16 may include a traffic monitor 28 in communication with a pattern recognition module 30 and a memory 32, such as random access memory (RAM), read only memory (ROM), one or more data buffers, flash memory, and/or the like. The traffic pattern determination sub-system 16 may be configured to determinate traffic patterns based on video surveillance, infrared signals, heat gradients, and/or the like. As such, the traffic monitor 28 may include one or more video cameras, infrared light detectors, thermal sensors, or the like. For example, the traffic monitor 28 may detect movement through a traffic surveillance area by capturing video of the traffic surveillance area. Movement of individuals through the traffic surveillance area is analyzed by the pattern recognition module 30, which may include one or more processors, microcontrollers, integrated circuits, and/or the like. The pattern recognition module 30 receives signals from the traffic monitor 28 and generates traffic data based on the received signals. The pattern recognition module 30 analyzes the traffic data to determine movement of individuals within a traffic surveillance area. Additionally, the pattern recognition module 30 may analyze the traffic data to determine the velocity of individuals when moving within the traffic surveillance area. Alternatively, movement of individuals through the traffic surveillance area may be detected through infrared light beams that change when individuals pass therethrough. Also, alternatively, movement of individuals through the traffic surveillance may be detected through thermal imaging devices, heat sensors, or the like that sense heat at various points within the traffic surveillance area. Data from the pattern recognition module 30 may be stored in the memory 32. The data may then be transmitted to the communication module 18 of the monitoring sub-system 12.

The monitoring sub-system 12 receives tag and traffic data from the tag detection sub-system 14 and the traffic pattern determination sub-system 16, respectively. The correlation module 20 analyzes the tag and traffic data received from the tag detection sub-system 14 and the traffic pattern determination sub-system 16, respectively, to determine a level of correlation between the tag data from the tag detection sub-system 14 and the traffic data from the traffic pattern determination sub-system 16. If the degree of correlation between the tag data and the traffic data is high, then the correlation module 20 may determine that a tagged article is leaving a location, as explained below. If the degree of correlation between the tag data and the traffic data is low, then the correlation module 20 may determine that a tagged article is not leaving the location. Additionally, based on the degree of correlation, the correlation module 20 may associate a detected tag to a specific individual if multiple individuals are to be simultaneously tracked by the traffic-pattern determination sub-system 16.

The tag analysis module 24 and the pattern recognition module 30 are shown as being within the tag detection sub-system 14 and the traffic pattern determination sub-system 16, respectively. However, the tag analysis module 24 and the pattern recognition module 30 may be parts of the monitoring sub-system 12.

Figure 2:
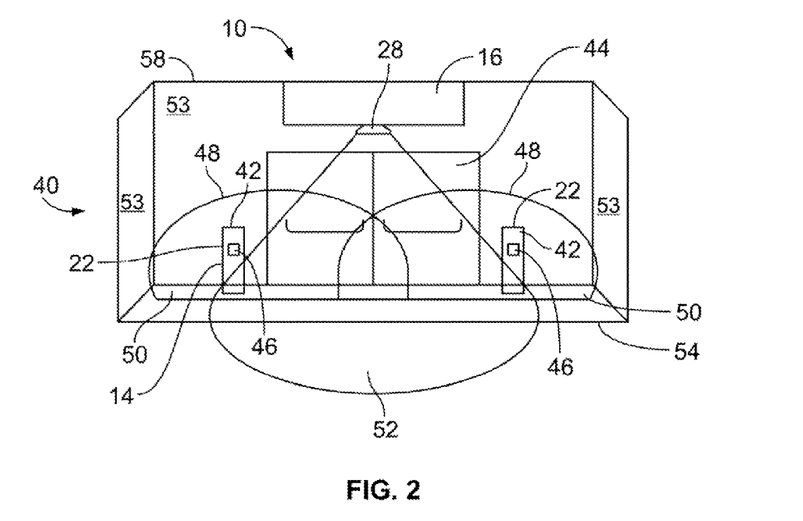
FIG. 2 illustrates a simplified view of a tag detection system within a location, according to an embodiment of the present disclosure.

FIG. 2 illustrates a simplified view of the tag detection system 10 within a location 40, according to an embodiment of the present disclosure. In FIG. 2, the location 40 is shown as being partially defined by adjacent walls 53, however the depiction of walls 53 is only for ease of illustration as proximity to a wall or walls in not required for the operation of the inventive system. The tag detection system 10 includes the tag detection sub-system 14 and the traffic pattern determination sub-system 16. The tag detectors 22 of the tag detection sub-system 14 may include opposed pedestals 42 proximate an exit portal 44 of the location 40. Each pedestal 42 may include a transceiver 46 that transmits and receives signals within a surveillance zone 48. The transceivers 46 are configured to receive signals from a tag, such as an RFID tag, secured to an article. As shown, the surveillance zones 48 may include over-range areas 50 outside of an envelope of the exit portal 44. The surveillance zones 48 are configured to detect the presence of a tag through a suitable area. For example, the surveillance zones 48 may be wide, high, and long enough to detect the presence of a tag moving toward the exit portal 44. More or less pedestals 42 than those shown may be used. While the tag detectors 22 are shown as including pedestals on either side of the exit portal 44, the tag detectors 22 may alternatively be suspended from the ceiling, underneath the floor 54, and/or the like.

The traffic pattern determination sub-system 16 includes the traffic monitor 28, such as a video camera, thermal imaging unit, infrared camera, and/or the like, that monitors a traffic surveillance area 52. The traffic pattern determination sub-system 16 may be suspended from the ceiling 58, as shown. Alternatively, the traffic pattern determination sub-system 16 may include multiple monitors 28 secured to or proximate the pedestals 42, for example. Also, alternatively, the traffic pattern determination sub-system 16 may include one or more monitors 28 extending from the floor 54.

Figure 3:
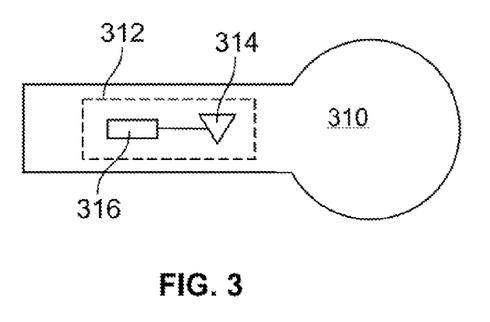
FIG. 3 illustrates a simplified view of an RFID tag, according to an embodiment of the present disclosure.

FIG. 3 illustrates a simplified view of an RFID tag 310, according to an embodiment of the present disclosure. The RFID tag 310 is configured to be attached to an article for sale, such as an article of clothing, an article to be inventoried, or the like. The RFID tag 310 may include an inlay 312 that contains or otherwise supports an internal antenna 314 connected to a memory 316, which may store identification information, such as an electronic serial number, of the RFID tag 310. Alternatively, instead of the RFID tag 310, an EAS tag, microwave tag, RF tag, or the like, may be used. The tag, such as the RFID tag 310, is configured to be detected by the tag detector 22.

Figure 4:
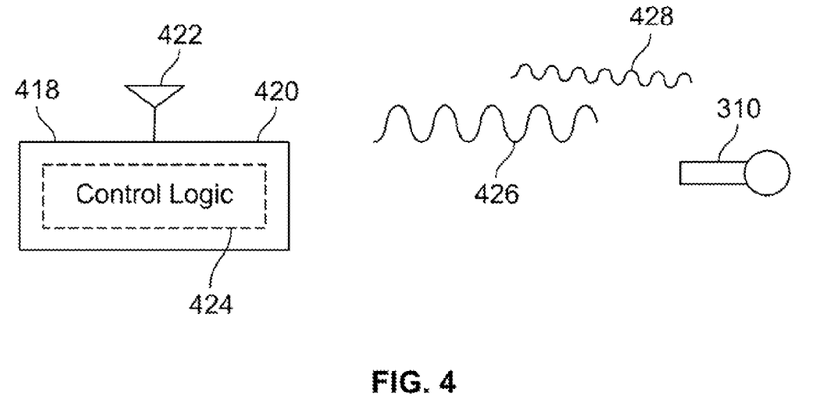
FIG. 4 illustrates a simplified view of an RFID reader in communication with an RFID tag, according to an embodiment of the present disclosure.

FIG. 4 illustrates a simplified view of an RFID reader 418 in communication with the RFID tag 310, according to an embodiment of the present disclosure. The RFID reader 418 may be an example of a tag detector 22, as shown in FIGS. 1 and 2. Instead of an RFID reader, the tag detector 22 may be configured to monitor other signals, such as microwaves, RF signals, or the like, depending on the nature of the tag. The RFID reader 418 may include a housing 420, such as a pedestal, that may be secured in a fixed position within a location, such as a store. The RFID reader 418 also includes one or more transceivers and/or antennas 422, each including a transmitter and receiver, operatively connected to the tag analysis module 24 (shown in FIG. 1), which may include a processing unit or control logic 424 configured to control operation of the RFID reader 418. As noted, the RFID reader 18 may include more than one antenna 422. For example, the RFID reader 418 may be in communication with multiple antennas 422 positioned within a particular location. The control logic 424 may be or include a central processing unit (CPU), processor, microprocessor, microcontroller, integrated circuit, and/or the like, which may include a memory, or may be operatively connected to separate and distinct memory.

In operation, the RFID reader 418 sends an interrogation signal 426 to the RFID tag 310, which may be secured to or embedded within a product or item, over a particular frequency or channel. The RFID tag 310 receives the interrogation signal 426 and sends a response signal 428 back to the RFID reader 418 over the same or different frequency or channel. The response signal 428 may be encoded with identification information of the RFID tag 310. The identification information may include a serial number or other such information that allows the RFID reader 418 to determine the exact identity of the RFID tag 310.

The RFID reader 418 receives the response signal 428 through the antenna 422 and passes the encoded information and RFID parameters to the control logic. For example, the control logic 424 may determine received signal strength indicators (RSSI), RF phase angle, amplitude, and the like, in addition to the identification information, from the response signal 428. The control logic 424 may compare successive response signals 428 over time, such as a predetermined sampling period, to determine if the RFID tag 310 is within the surveillance zone(s) 48, shown in FIG. 2. For example, if the control logic 424 detects the RFID tag 310, then the control logic 424 may determine that the RFID tag 310 is within the surveillance zone(s) 48. If, however, the control logic 424 does not detect the presence of the RFID tag 310, then the control logic determines that the RFID tag 310 is not within the surveillance zone(s) 48.

Figure 5:
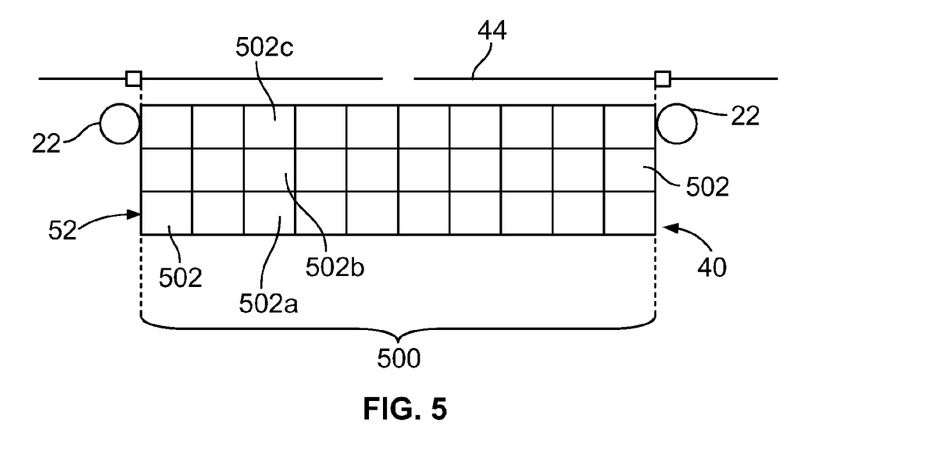
FIG. 5 illustrates a simplified top view of a traffic surveillance area, according to an embodiment of the present disclosure.

FIG. 5 illustrates a simplified top view of a traffic surveillance area 52, according to an embodiment of the present disclosure. The traffic surveillance area 52 is an area of the location monitored by the traffic monitor 28 (shown in FIGS. 1 and 2) and is generally located proximate the exit portal 44 within an envelope 500 of the exit portal 44. The traffic surveillance area 52 may be larger or smaller than shown. In short, the traffic surveillance area 52 may be as large or small as desired. The pattern recognition module 30 (shown in FIG. 1) may form the traffic surveillance area 52 as a grid having a plurality of grid elements 502. Each grid element 502 may be a uniform shape and size. For example, each grid element 502 may be 6"×6".

It is to be understood that the traffic surveillance area 52 may not be physically demarcated on a floor of a location. Rather, the grid elements 502 may be determined, sized, and spaced by the pattern recognition module 30, or other such hardware, software, firmware, and the like of the traffic determination sub-system 16. For example, the traffic determination sub-system 16 may configure the traffic surveillance area 52 as a virtual grid. Additionally, while the grid is shown having square or rectangular grid elements 502, the grid elements may be sized and shaped differently than shown. For example, the grid elements may be circular, triangular, octagonal, or the like. Moreover, the grid elements may be irregularly sized and shaped, such that some grid elements are larger or smaller than others.

In operation, the pattern recognition module 30 determines movement toward or away from the exit portal 44 by analyzing movement within the grid elements 502. For example, movement from grid element 502a to 502b and 502c over a predetermined time, such as, for example, >1 second, causes the pattern recognition module 30 to determine movement toward the exit portal 44. Alternatively, movement from grid element 502c to 502b and 502a over a predetermined time causes the pattern recognition module 30 to determine movement away from the exit portal 44. Additionally, the pattern recognition module 30 may determine velocity of individuals within the grid elements by detecting movement within the grid elements 502 over time. For example, movement from grid element 502c to 502b and then 502a over a certain period of time yields velocity information (velocity=distance/time).

Additionally, the tag analysis module 24 detects the presence of a tag, such as an EAS or RFID tag, for example, within surveillance zones, such as shown in FIG. 2. For example, as a tag moves toward a tag detector 22, such as an EAS transceiver, the amplitude of the tag changes at a given rate and creates a pattern that depends on the position of the tag relative to the tag detectors 22. If a parameter, such as amplitude, signal strength, or the like, of the signal received from the tag increases over a predetermined time, then the tag analysis module 24 may determine that the tag is being moved toward the tag detector 22 proximate the exit portal 44. Conversely, if the parameter decreases over the predetermined time, then the tag analysis module 24 may determine that the tag is moving away from the tag detector 22 proximate the exit portal 44, toward an interior of the location 40. The monitoring sub-system 12 compares and correlates tag data received from the tag detection sub-system 14 and traffic data received from the traffic pattern determination sub-system 16 to accurately determine if a tagged article is being removed from the location 40. For example, the monitoring sub-system 12 uses both the tag data received from the tag detection sub-system 14 and the traffic data received from the traffic pattern determination sub-system to accurately assess whether or not a tagged article is being removed from a location.

Figure 6:
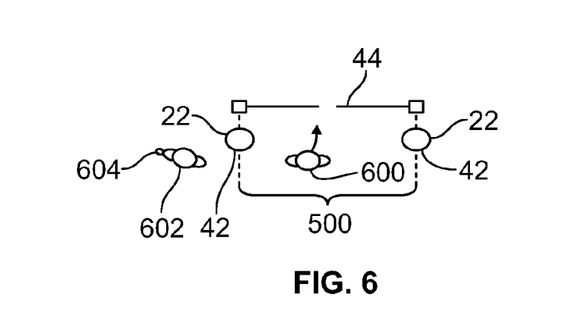
FIG. 6 illustrates a simplified top view of individuals proximate an exit portal, according to an embodiment of the present disclosure.

FIG. 6 illustrates a simplified top view of individuals 600 and 602 proximate the exit portal 44, according to an embodiment of the present disclosure. Referring to FIGS. 1, 2, 5, and 6, the individual 600 is moving toward the exit portal 44. The traffic monitor 28 of the traffic pattern determination sub-system 16 detects the motion of the individual 600. In particular, the pattern recognition module 30 receives signals from the traffic monitor 28 and determines that the individual 600 is moving toward the exit portal 44 at a certain velocity. However, the individual 600 does not have an article that is tagged.

The individual 602 is carrying a tagged article 604, but is outside of the envelope 500. The pattern recognition module 30 receives signals from the traffic monitor 28 and determines that the individual 602 is also moving toward the exit portal 44 at a certain velocity that differs from the velocity of the individual 600. The tag detector(s) 22 detect the tagged article 604 within surveillance zone(s) and calculates the tag data, for example, the tag's amplitude rate of change. The correlation module 20 receives the tag data (including the rate of change of the amplitude of the tag) from the tag detection sub-system 14 and the traffic data, which may include velocities from both individuals 600 and 602, from the traffic pattern determination sub-system 16. The correlation module 20 may then determine that the rate of change of the amplitude of the tag matches the velocity of the individual 602. Thus, while a tag was detected by the system, the correlation module 200 determines that the tag is carried by the individual 602 who is moving outside of the envelope 500. Therefore, the correlation module 20 prevents the monitoring sub-system 12 from sending an alert or alarm signal which would otherwise activate an alarm.

Figure 7:
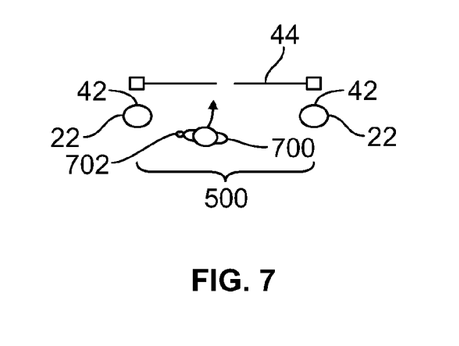
FIG. 7 illustrates a simplified top view of an individual proximate an exit portal, according to an embodiment of the present disclosure.

FIG. 7 illustrates a simplified top view of an individual 700 proximate the exit portal 44, according to an embodiment of the present disclosure. Referring to FIGS. 1, 2, 5, and 7, the individual 700 is moving toward the exit portal 44. The traffic monitor 28 of the traffic pattern determination sub-system 16 detects the motion of the individual 700. In particular, the pattern recognition module 30 receives signals from the traffic monitor 28 and determines that the individual 700 is moving toward the exit portal 44. Moreover, the individual 700 is carrying a tagged article 702.

The tag detector(s) 22 detect the tagged article 604 within surveillance zone(s). The correlation module 20 receives the tag data from the tag detection sub-system 14 and the traffic data from the traffic pattern determination sub-system 16. The correlation module 20 determines that the traffic data indicates movement toward the exit portal 44, and the signal strength of the tag data received from the tag detection sub-system 14 is increasing at the same rate that the individual 700 is approaching the tag detector 22. Thus, the tag data and the traffic data correlate strongly (to a high degree) with one another. Therefore, the correlation module 20 may output a high correlation signal, which causes the monitoring sub-system 12 to activate an alarm by sending an alert or alarm signal.

The tag detection sub-system 14 may determine a strength of a tag parameter, such as amplitude of a received signal from the tag, a rate of change of the received tag signal (such as a change in phase angle, RSSI, and/or the like), and/or the like, to determine the tag data. For example, as a tag moves into the envelope 500 between the pedestals 42, the amplitude of the received signal may increase, thereby causing the tag analysis module 24 to determine that the tag is moving toward the tag detector(s) 22 proximate the exit portal 44. However, as the tag is moved away from the envelope, the amplitude of the received signal diminishes. The tag detection sub-system 14 may determine tag movement through signal strength, amplitude, or the like, of a received tag signal, the rate of change of the received tag signal, phase angle differences of the received tag signal over a predetermined sampling period, and/or the like.

Figure 8:
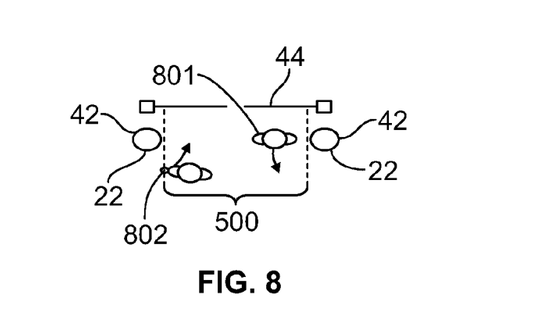
FIG. 8 illustrates a simplified top view of individuals proximate an exit portal, according to an embodiment of the present disclosure.

FIG. 8 illustrates a simplified top view of individuals 800 and 801 proximate the exit portal 44, according to an embodiment of the present disclosure. The individual 800 is carrying a tagged article 802 and moving toward the exit portal 44, while the individual 801, without a tagged article, is moving into the location. The correlation module 18 of the monitoring sub-system 12 may correlate the movement toward the tag detector(s) 22 proximate the exit portal 44 of the individual 800 with a strong tag signal parameter due to the tag 802 being within the envelope 500 between the pedestals 42 to determine that the tagged article 802 is being removed from the location. The movement of the individual 801 into the location does not mask the correlated data regarding the individual 800. Thus, even though multiple individuals 800 and 801 are proximate the exit portal 44, the monitoring sub-system 12 is able to determine that the tagged article 802 is being removed from the location.

Referring to FIGS. 6-8, the tag data and the traffic data are analyzed by the correlation module 20 to determine whether or not a tag is being removed from the location. If the traffic data indicates movement toward the exit portal, and the tag data indicates a signal parameter related to movement toward the tag detector(s) 22 proximate the exit portal 44 within the envelope 500 and the tag data highly correlates with the traffic data, then the correlation module 20 determines that the tag is being removed from the location. Conversely, a signal parameter (such as amplitude) of a non-moving tag remains unchanged, and the correlation module 20 determines that the non-moving tag is not being removed from the location. If there is a high degree of correlation between the tag data and the traffic data with respect to movement toward the exit portal 44, then the correlation module 20 determines that the tag is being removed from the location. If, however, there is a low degree of correlation between the tag data and the traffic data, then the correlation module 20 determines that the tag is not being removed from the location. For example, if the traffic data indicates movement toward the exit portal, but the signal parameter of the tag data does not indicate movement toward the exit portal 44 (such as a weak received signal, a low amplitude of the signal, amplitude rate of change that does not match an individual's velocity, or the like), then the traffic data and the tag data do not correlate with one another, or the degree of correlation is low. If the degree of correlation is high, but the traffic data indicates movement outside of the envelope 500 and/or movement is not toward the exit portal 44, then the correlation module 20 prevents the monitoring system from sending an alarm activation signal.

Figure 9:
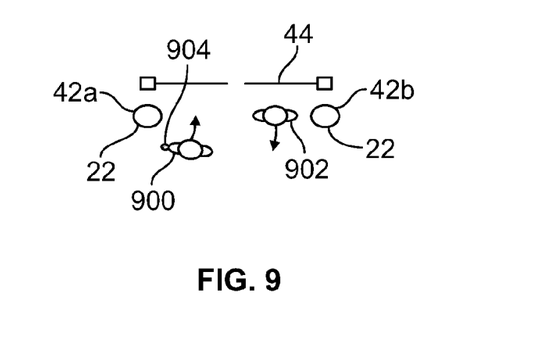
FIG. 9 illustrates a simplified top view of individuals proximate an exit portal, according to an embodiment of the present disclosure.

FIG. 9 illustrates a simplified top view of individuals 900 and 902 proximate the exit portal 44, according to an embodiment of the present disclosure. The individual 900 is carrying a tagged article 904 and is walking toward the exit portal 44, while the individual 902 is walking away from the exit portal 44 into the location. If the amplitude of the received signal from the tag secured to the tagged article 904 detected at the pedestal 42a is greater than the amplitude of the received signal from the tag detected at the pedestal 42b, then the correlation module 20 and/or the tag analysis module 24 (shown in FIG. 1) determines that the tagged article 904 is leaving the location. If, however, the individual 902 was carrying the tagged article, then the amplitude of received tag signal detected at the pedestal 42b would be greater than that at the pedestal 42a, and the correlation module 20 and/or the tag analysis module would determine that the tagged article is entering the location.

Additionally, embodiments of the present disclosure may be used to determine the direction of movement with respect to the exit portal. For example, if the tag detection sub-system 14 determines that the tag amplitude detected at the pedestal 42a is greater than the at the pedestal 42b, and the traffic pattern determination sub-system 16 confirms that the individual 900 is closer to the pedestal 42a, then the monitoring sub-system 12 may determine that the motion of the individual 900 is toward the exit portal 44. Conversely, if the tag detection sub-system 14 determines that the tag amplitude detected at the pedestal 42b is greater than at the pedestal 42a, and the traffic pattern determination sub-system 16 confirms that the individual 902 is closer to the pedestal 42b, then the monitoring sub-system 12 may determine that the motion of the individual 902 is away from the exit portal 44.

If, however, the amplitude of the received tag signal is equal at both the pedestals 42a and 42b, and the individual 900 is equidistant from the pedestals 42a and 42b, and the traffic pattern determination sub-system 16 detects motion of the individual 900 toward the exit portal 44, then the monitoring sub-system may determine that the motion of the individual 900 is toward the exit portal 44. If, however, the amplitude of the received tag signal is equal at both the pedestals 42a and 42b, and the individual 902 is equidistant from the pedestals 42a and 42b, and the traffic pattern determination sub-system 16 detects motion of the individual 902 away from the exit portal 44, then the monitoring sub-system may determine that the motion of the individual 902 is away from the exit portal 44. If, however, the individuals are not equidistant between the pedestals 42a and 42b, then the direction may be determined by the individual that is closer to the area that is in the middle of the pedestals 42a and 42b.

Figure 10:
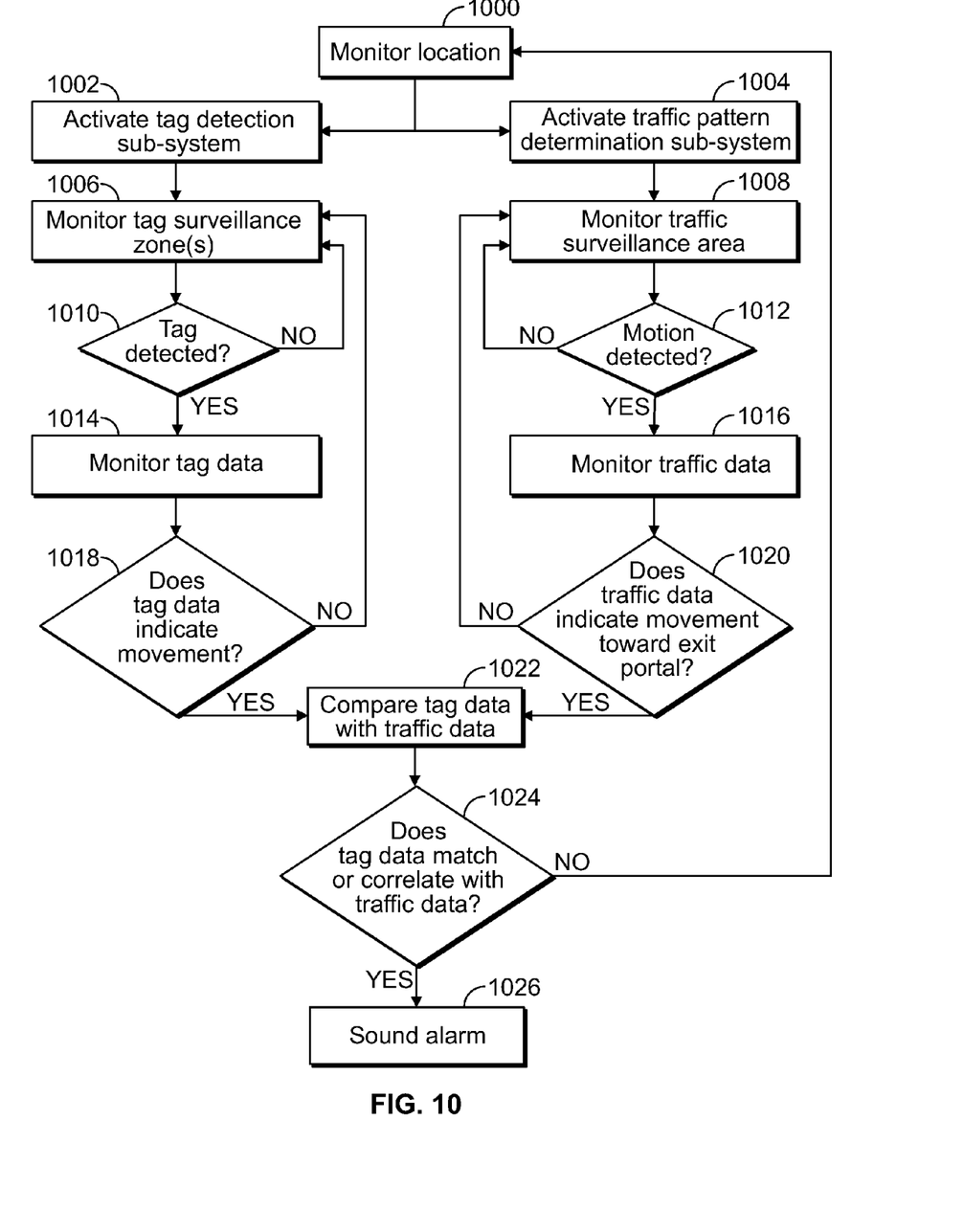
FIG. 10 illustrates a flow chart of a method of detecting movement of a tagged article, according to an embodiment of the present disclosure.

FIG. 10 illustrates a flow chart of a method of detecting movement of a tagged article, according to an embodiment of the present disclosure. At 1000, a location is monitored, such as with the system 10 of FIG. 1. At 1002, a tag detection sub-system is activated. Similarly, at 1004, a traffic pattern determination sub-system is activated. At 1006, a tag surveillance zone(s) is monitored with the tag detection sub-system. At 1008, a traffic surveillance area or zone is monitored with the traffic pattern determination sub-system.

At 1010, the tag detection sub-system determines if a tag is detected. Similarly, at 1012, the traffic pattern determination sub-system determines if motion is detected in the traffic surveillance area. Then, at 1014, if a tag is detected, the tag detection sub-system monitors and tracks the tag data, while at 1016, if motion is detected, the traffic pattern determination sub-system monitors and tracks the traffic data. However, if a tag is not detected, the process returns to 1006 from 1010. Similarly, if motion is not detected, the process returns to 1008 from 1012.

As the tag data is being monitored and tracked, the method proceeds to 1018, in which the tag analysis module 24 determines if the tag data indicates movement towards a tag detector, such as a pedestal proximate an exit portal. For example, if the rate of a tag parameter, such as amplitude, increases, or the rate of change of amplitude exceeds a predetermined threshold, then the tag analysis module 24 may determine movement toward the tag detector pedestal proximate the exit portal. If, however, the strength of the tag parameter decreases, or the rate of change of amplitude is below a predetermined threshold, then the tag analysis module 24 may determine movement away from the tag detector pedestal proximate exit portal. If the tag data does not indicate movement toward the tag detector pedestal proximate the exit portal, the method returns to 1006.

At the same time, as the traffic data is being monitored, the method proceeds from 1016 to 1020 in which the pattern recognition module 30 determines if the traffic data indicates movement towards the exit portal. For example, the pattern recognition module 30 may analyze a grid pattern within a traffic surveillance zone or area to determine movement toward or away from the exit portal, as described above with respect to FIG. 5. If the traffic data does not indicate movement toward the exit portal, the method returns to 1008.

If, however, the traffic data indicates movement toward the exit portal, the method proceeds to 1022, in which the tag data is compared with the traffic data. At 1024, the correlation module 20 of the monitoring sub-system 12 determines the degree of correlation between the tag data and the traffic data. The correlation module 20 may determine a correlation between the tag data and the traffic data based on a proportional relationship between the tag data and the traffic data. For example, if the strength of rate of change of the tag data is directly proportional to that of the traffic data, then a high degree of correlation may be determined. The correlation module 20 may store a correlation threshold. If the correlation between the tag data and the traffic data exceeds the correlation threshold, the method may proceed to 1026 in which an alarm is sounded. For example, if the tag data and the traffic data both indicate movement toward the exit portal at a particular rate and within 5% agreement, for example, then the method may proceed to 1026. The correlation threshold may be any predetermined value selected by an operator. For example, the correlation threshold may be based on a matching percentage, rate of change percentage, or various other values that are used to compare the tag data with the traffic data. If the tag data does not match with the traffic data, or the correlation threshold is not met, the method returns to 1000.

The direction(s) of movement of individuals may be determined as described above with respect to FIG. 9, for example.

Thus, embodiments of the present disclosure provide a system and method of accurately determining movement of a tagged article. Embodiments of the present disclosure include a systems and methods that accurately determine movement of a tagged article by analyzing tag data received from a tag detection sub-system and traffic data received from a traffic pattern determination sub-system. Embodiments of the present disclosure may provide systems and methods that compare tag data with traffic data to determine if there is a correlation therebetween. If a tag is moving toward an exit portal, there will be a high degree of correlation between the tag data and the traffic data. The pattern of a tag parameter, such as amplitude, change in amplitude, or the like may be compared with a pattern of traffic within a traffic surveillance area. If the patterns match or correlate strongly, then an alarm may be sounded. If, however, the patterns do not match or are uncorrelated, then the tag is not being removed from the location, and a false alarm is avoided.

As described, software configured to operate the method and system described above may be stored in the monitoring sub-system, the tag detection sub-system, and/or the traffic pattern determination sub-system, and/or a central computer in communication with the sub-systems. The instructions on which the sub-systems and/or the central computer operate may be stored on a tangible and non-transitory (for example, not a transient signal) computer readable storage medium, such as a memory. The memory may include one or more computer hard drives, flash drives, RAM, ROM, EEPROM, and the like. Alternatively, one or more of the sets of instructions that direct operations of the system may be hard-wired into the logic of the sub-systems and/or the central computer.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the disclosure without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A system for determining motion of a tagged article, the system comprising:
    a tag detection sub-system configured to output tag data regarding movement of the tagged article with respect to a tag detector proximate an exit portal of a location;

a traffic pattern determination sub-system configured to output traffic data regarding movement of an individual with respect to the exit portal of the location; and a monitoring sub-system including a correlation module configured to compare the tag data with the traffic data to accurately determine one or both of motion or path of the tagged article.

2. The system of claim 1, wherein the tag detection sub-system comprises one or more tag detectors in communication with a tag analysis module, wherein the tag analysis module is configured to generate the tag data based on signals received from the one or more tag detectors.

3. The system of claim 2, wherein the one or more tag detectors are configured to detect the tagged article within one or more surveillance zones.

4. The system of claim 3, wherein the tag data varies throughout the one or more surveillance zones.

5. The system of claim 2, wherein the one or more tag detectors comprises one or more pedestals, wherein each of the one or more pedestals comprises a transceiver configured to communicate with the tagged article.

6. The system of claim 1, wherein the tag detection sub-system comprises a radio frequency identification (RFID) reader, and wherein the tagged article comprises an RFID tag.

7. The system of claim 1, wherein the traffic pattern determination sub-system comprises a traffic monitor in communication with a pattern recognition module, wherein the pattern recognition module is configured to generate the traffic data based on signals received from the traffic monitor.

8. The system of claim 7, wherein the traffic monitor is configured to monitor movement within a traffic surveillance area proximate the exit portal.

9. The system of claim 8, wherein the traffic surveillance area is divided into a plurality of grid elements.

10. The system of claim 7, wherein the traffic monitor comprises one or more of a video camera, an infrared camera, or a thermal imaging device.

11. The system of claim 1, wherein the correlation module determines that the tagged article is moving toward the exit portal when the tag data correlates with the traffic data.

12. The system of claim 11, wherein the correlation module determines a degree of correlation based on a comparison of a correlation between the tag data and the traffic data with a threshold value.

13. A method of determining motion of a tagged article, the method comprising:
generating tag data regarding movement of the tagged article with respect to a tag detector proximate an exit portal of a location;
generating traffic data regarding movement of an individual with respect to the exit portal of the location; and
comparing the tag data with the traffic data with a correlation module of a monitoring sub-system, wherein the comparing operation accurately determines one or both of motion or path of the tagged article.

14. The method of claim 13, wherein the generating tag data operation comprises generating the tag data based on signals received from one or more tag detectors.

15. The method of claim 14, wherein the generating tag data operation comprises detecting the tagged article within one or more surveillance zones.

16. The method of claim 15, wherein the tag data varies throughout the one or more surveillance zones.

17. The method of claim 14, further comprising configuring the one or more tag detectors as one or more pedestals proximate the exit portal.

18. The method of claim 13, wherein the generating tag data operation comprises generating radio frequency identification (RFID) tag data.

19. The method of claim 13, wherein the generating traffic data operation comprises generating the traffic data based on signals received from a traffic monitor.

20. The method of claim 19, wherein the generating traffic data traffic operation comprises monitoring movement within a traffic surveillance area proximate the exit portal.

21. The method of claim 20, wherein the traffic surveillance area is divided into a plurality of grid elements.

22. The method of claim 19, wherein the traffic monitor comprises one or more of a video camera, an infrared camera, or a thermal imaging device.

23. The method of claim 13, further comprising determining, with the correlation module, that the tagged article is moving toward the exit portal when the tag data correlates with the traffic data.

24. The method of claim 23, wherein the determining operation comprises determining a degree of correlation based on a comparison of a correlation between the tag data and the traffic data with a threshold value.

* * * * *